Dec. 8, 1931.   P. SUTER   1,835,248
VENTILATING MEANS FOR ELECTRICAL MACHINES
Filed March 1, 1929
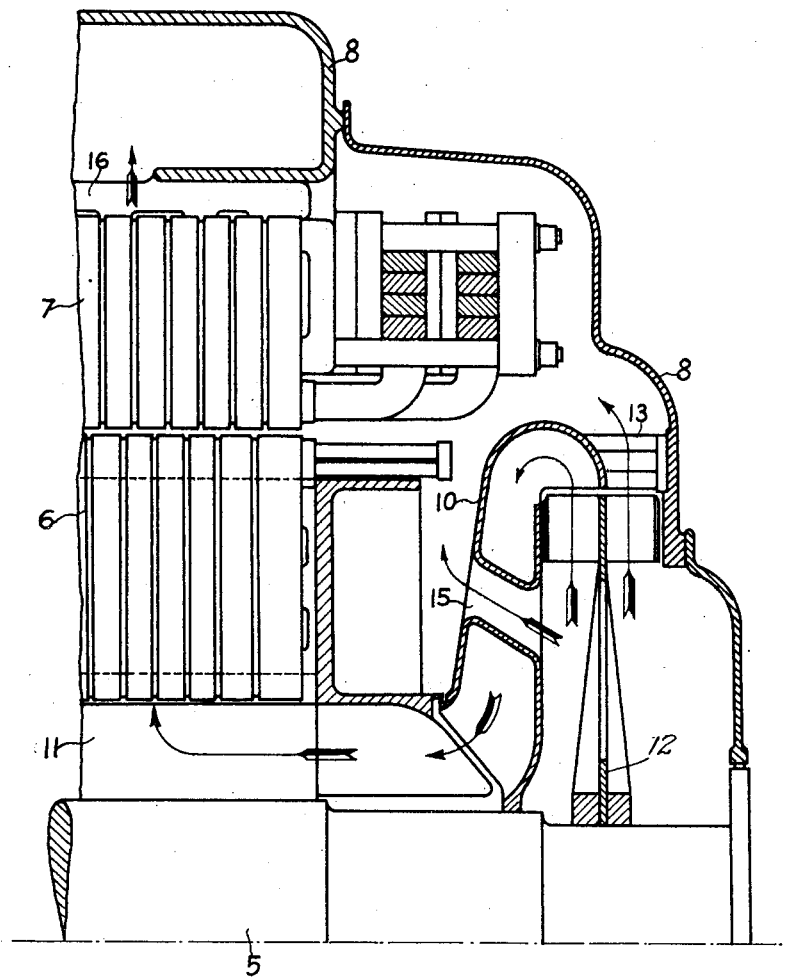
Inventor
Philipp Suter
By Alfred H. Dyson
Attorney.

Patented Dec. 8, 1931

1,835,248

UNITED STATES PATENT OFFICE

PHILIPP SUTER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

VENTILATING MEANS FOR ELECTRICAL MACHINES

Application filed March 1, 1929, Serial No. 343,823, and in Germany March 2, 1928.

This invention relates to improvements in electrical machines and, more particularly, to means for cooling large dynamo-electric machines.

The space available for ventilating passages in large motors and generators is usually so restricted that the large quantities of air required for properly cooling such machines are difficult to supply. Since such machines are built, at the present time, with large overall dimensions, the supply of a large quantity of cooling fluid is likely to lead to temperature differences in the machine which differences produce mechanical strains and tend to increase the severity of electrical strains, such as short-circuits. It is, therefore, of the greatest importance that the air or other fluid supplied to a large motor or generator for cooling purposes be distributed as uniformly as possible throughout the entire machine, and that the air be delivered as rapidly as possible to several different points within the machine from which it may be distributed.

It is, therefore, among the objects of the present invention to provide means by which the cooling fluid supplied to a large motor or generator may be uniformly distributed therethrough.

Another object of the invention is to provide separate cooling fluid ducts or passageways, within the housing of large electrical machines, for conducting the cooling fluid to a plurality of different points interiorly of such machine.

A further object of the invention is to provide a fan or blower fixed to and operated by the rotor of an electrical machine which is so arranged that the air delivered thereby must flow through a plurality of separate passageways formed in the several portions of the machine.

Objects and advantages, other than those above set forth, will be apparent from the following description of the drawing which is a fragmentary, longitudinal, cross-sectional view of a generator embodying the present invention.

Referring more particularly to the drawing by characters of reference, reference numeral 5 indicates the shaft of a rotor member 6 of a large electrical machine having a stator member 7, both the rotor and the stator members being enclosed within a housing 8. The housing 8 is provided with an air duct 10 connected at one end with an axial channel or slot 11 formed in the rotor member 6, adjacent the periphery of the shaft 5.

A fan or blower 12 is fixed to the shaft 5, adjacent one end thereof, and is arranged to deliver cooling fluid, supplied to the inlet of the fan, to the interior of the housing 8 by way of air duct 10, air ports or passageways 13, and port 15 leading through the air duct.

It will be seen that both the rotor member 6 and the stator member 7 are formed in such manner as to provide channels between the laminations thereof through which the air passing through air duct 10 and interiorly of the housing by way of air ports 13 and 15 will flow through the channels in the direction of outlet 16, as indicated by the arrow. The rotor and stator members may be supplied with guide vanes, or the laminations of the stator member, in particular, may be so formed with ribs or other projections from the surfaces thereof that the several laminations are spaced to provide air channels between the individual laminations.

It will be apparent that the arrangement of fan and air channels as shown provides means for simultaneously supplying a plurality of different points of the machine with cooling fluid, thereby obtaining an even temperature throughout. The quantity of cooling fluid forced through the machine is greatly increased by separating the air passages without increasing the pressure at the fan. The size and weight of the fan is thereby so reduced as to be negligible in relation to the total size and weight of the rotor member.

Although only a single embodiment of this invention has been illustrated and described, it will be understood that various other embodiments are possible, and that various changes may be made without departing from the spirit of the invention or the scope of the claims.

The invention claimed is:
1. In an electrical machine, a shaft, a rotor fixed on said shaft, a stator disposed about said rotor, and means effective upon operation of said machine to induce flow of a stream of cooling fluid in a direction generally radial and outwardly from said shaft, said machine provided with a passage for directing a portion of said stream into cooling relation with said stator, said machine provided with a passage for receiving another portion of said stream and causing the same to reverse its direction of flow and enter into cooling relation with said rotor.

2. In an electrical machine, a shaft, a rotor fixed on said shaft, a stator disposed about said rotor, and means effective upon operation of said machine to induce flow of a stream of cooling fluid in a direction generally radial and outwardly from said shaft, said machine provided with passages for receiving respectively three portions of said stream, one of said passages shaped to reverse the direction of flow of the respective received stream portion and direct the same into cooling relation with said rotor.

3. In an electrical machine, a shaft, a rotor fixed on said shaft and provided with a ventilating passage extending axially of said shaft, a fan fixed on said shaft adjacent said rotor and effective upon operation of said machine to induce flow of cooling fluid in a direction generally radial and outwardly from said shaft, and means providing a generally S-shaped passage having one end disposed to receive a portion of said fluid and the other end disposed to direct said portion into said ventilating passage.

4. In an electrical machine, a shaft, a rotor fixed on said shaft and provided with a ventilating passage extending axially of said shaft, a fan fixed on said shaft adjacent said rotor and effective upon operation of said machine to induce flow of cooling fluid in a direction generally radial and outwardly from said shaft, and means providing a generally S-shaped passage having one end disposed to receive a portion of said fluid and the other end disposed to direct said portion into said ventilatng passage, said means provided with a port for receiving another portion of said fluid and directing the same into cooling relation with the adjacent ends of said rotor and stator.

In testimony whereof I have hereunto subscribed my name this 12th day of February A. D. 1929.

PHILIPP SUTER.